June 24, 1930.  E. O. ACKERMAN  1,765,477
VIBRATION DAMPENING DEVICE
Original Filed Oct. 12, 1927   2 Sheets-Sheet 1

INVENTOR
Eli O. Ackerman
BY Frank S. Greene
ATTORNEY

June 24, 1930.  E. O. ACKERMAN  1,765,477
VIBRATION DAMPENING DEVICE
Original Filed Oct. 12, 1927  2 Sheets-Sheet 2

INVENTOR
Eli O. Ackerman
BY Frank S. Greene
ATTORNEY

Patented June 24, 1930

1,765,477

UNITED STATES PATENT OFFICE

ELI O. ACKERMAN, OF COLUMBUS, OHIO

VIBRATION-DAMPENING DEVICE

Original application filed October 12, 1927, Serial No. 225,995, now Patent No. 1,718,100, dated June 18, 1929. Divided and this application filed June 10, 1929. Serial No. 369,550.

The present invention relates to vibration dampeners for the traction units of power driven railway cars and has for its object to provide means for dampening torsional vibrations in driving axles and attached traction wheels of railway cars to prevent cumulative vibrations which have a rail deforming action and cause the corrugation of track rails upon which the traction wheels run.

In my copending application Serial No. 225,995, filed Oct. 12, 1927, (Patent No. 1,718,100, granted June 18, 1929), I have disclosed a method of operating railway rolling stock to prevent rail corrugation by controlling the torsional vibratory action of the individual units of railway rolling stock and the present invention is a division of said application.

As more fully explained in said copending application, the corrugation of rails of electric railway lines has been found to be due to cumulative torsional vibrations set up in the traction units of the cars as the cars are being driven over the line and repeatedly occurring at certain points along the line.

The present invention has for its object to prevent such cumulative torsional vibrations in the traction units, composed of driving axles and attached traction wheels, and thereby prevent rail corrugation.

A further object is to provide a dampening device which is adapted to be mounted on a traction unit without altering the axle mounting or axle driving connections.

With the above and other objects in view, the invention may be said to comprise the vibration dampening device as illustrated in the accompanying drawings hereinafter described and particularly set forth in the appended claims, together with such variations and modifications thereof as will be apparent to one skilled in the art to which the invention appertains.

Reference should be had to the accompanying drawings in which.

The present invention, as illustrated in the accompanying drawings consists of a vibration dampener of the fly-wheel type which is mounted directly on either the axle or one or both of the wheels attached thereto.

Figure 2:
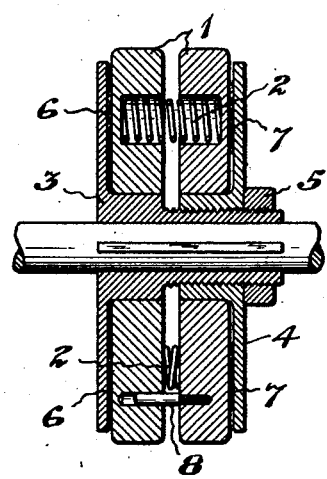
Fig. 2 is a section taken on the line indicated at 2—2 in Fig. 1.
Figure 1:
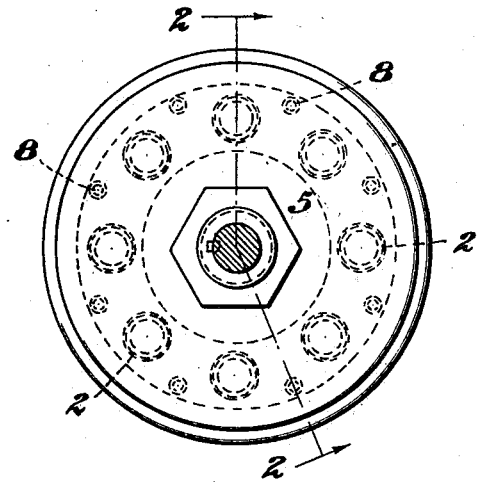
Figure 1 is a side elevation of a vibration dampener embodying the invention applied to a car axle.

The vibration dampener shown in Figs. 1 and 2 consists of a flywheel 1, divided into two parts which are held apart by means of a series of coil springs 2. The flywheel is mounted in a flanged hub 3 which is keyed to the axle and which carries a flanged collar 4, which is screwed on the hub and held in place by a jam nut 5. An annular piece of friction fabric 6, which may be made of material similar to brake band lining is riveted to the flange of the hub between the flange and one section of the flywheel and a similar band 7 is riveted to the flange of the collar nut 4 and lies between the other section of the flywheel and the collar flange. The two sections of the flywheel are held against relative circumferential movement by means of pins 8 which are fixed to one section and project into sockets formed in the other section. The springs 2 hold the two parts of the flywheel against the pieces of friction fabric 6 and 7 with whatever pressure is required and the pressure is adjustable by turning the collar nut 4 and locking it in adjusted position with the jam nut 5. The flywheel 1 may revolve independently of the hub and axle and when the axle revolves, the flywheel will be driven through the friction fabric face members 6 and 7. Should any attempt be made to quickly reverse the direction of revolution of the axle, the momentum of the flywheel 1 will oppose such attempt. When the spring pressure is adjusted so that the fabric will slip at the alternating speed of natural torque vibration of wheels and axle, the inertia of the flywheel will serve as a drag or dampener to oppose the torsional vibration of the axle.

Figure 3:
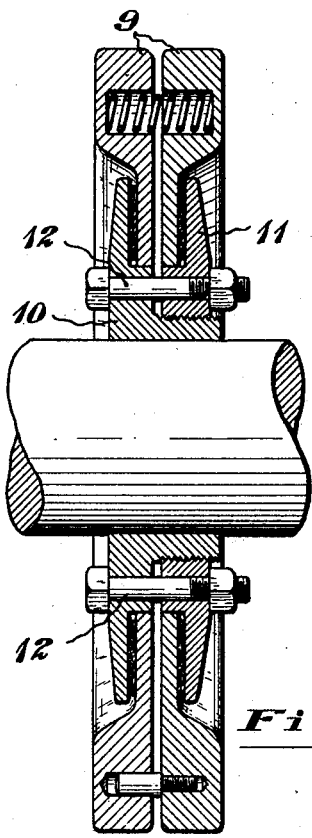
Fig. 3 is a sectional view showing a modified form of vibration dampener.

Fig. 3 shows an adaptation of the torsional vibration dampener to an axle of large diameter and is similar to the dampener as shown in Figs. 1 and 2, except that the flywheel 9 is held between a flange on a hub 10 and a flange nut 11 on the hub which is held in adjusted position by bolts 12 instead of by a jam nut as shown in Figs. 1 and 2.

Figure 4:
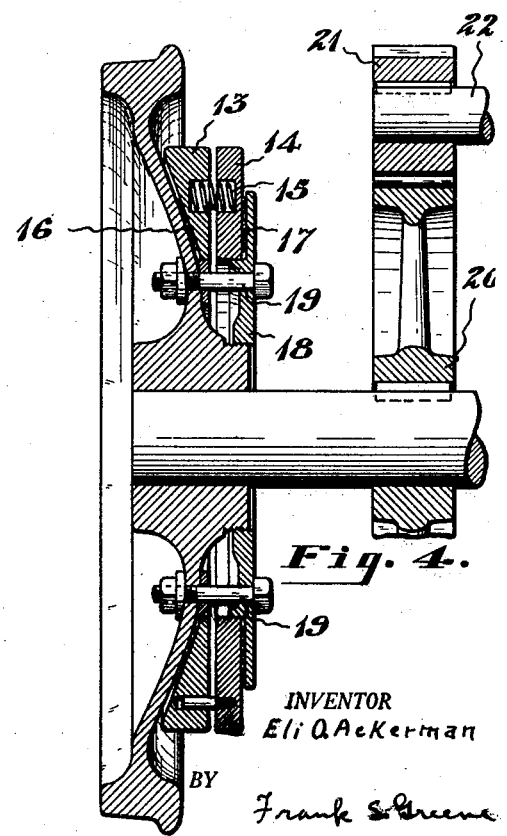
Fig. 4 is a sectional view showing a vibration dampener applied to a car wheel.

Fig. 4 shows an adaptation of the torsional vibration dampener for attachment directly to a car wheel, this dampener being useful where there is not sufficient room on the axle to mount a dampener such as shown in Figs. 1 and 2. In this form, the flywheel consists of inner and outer sections 13 and 14 which are pressed apart by coil springs 15. Section 13 of the flywheel is of substantially wedge form in radial section to fit against the inner face of the web of the car wheel and is pressed against an annular piece of friction fabric 16. The inner section 14 is pressed against a similar annular piece of friction fabric 17 secured upon the inner face of a flange nut 18, which is screwed upon the hub of the wheel and held in adjusted position by means of bolts 19 extending through the plate and the web of the car wheel.

The traction unit to which the various forms of vibration dampeners herein illustrated are applied consist of a driving axle with traction wheels fixed to the opposite ends thereof.

Figs. 1 and 2 show the dampening device attached directly to the axle and Figs. 3 to 6 show dampening devices mounted on the traction wheels. In electric railway cars, the traction units are driven from a suitable motor through spur gearing such as illustrated in Fig. 4 in which there is shown a large spur gear 20 fixed to the axle which is driven by a pinion 21 fixed to a suitable drive shaft 22. As more fully explained in my copending application above referred to, the driving gears tend to set up torsional vibrations in the traction units which, at certain critical speeds, become cumulative and have a rail deforming action producing corrugations in the rail treads.

Figure 5:
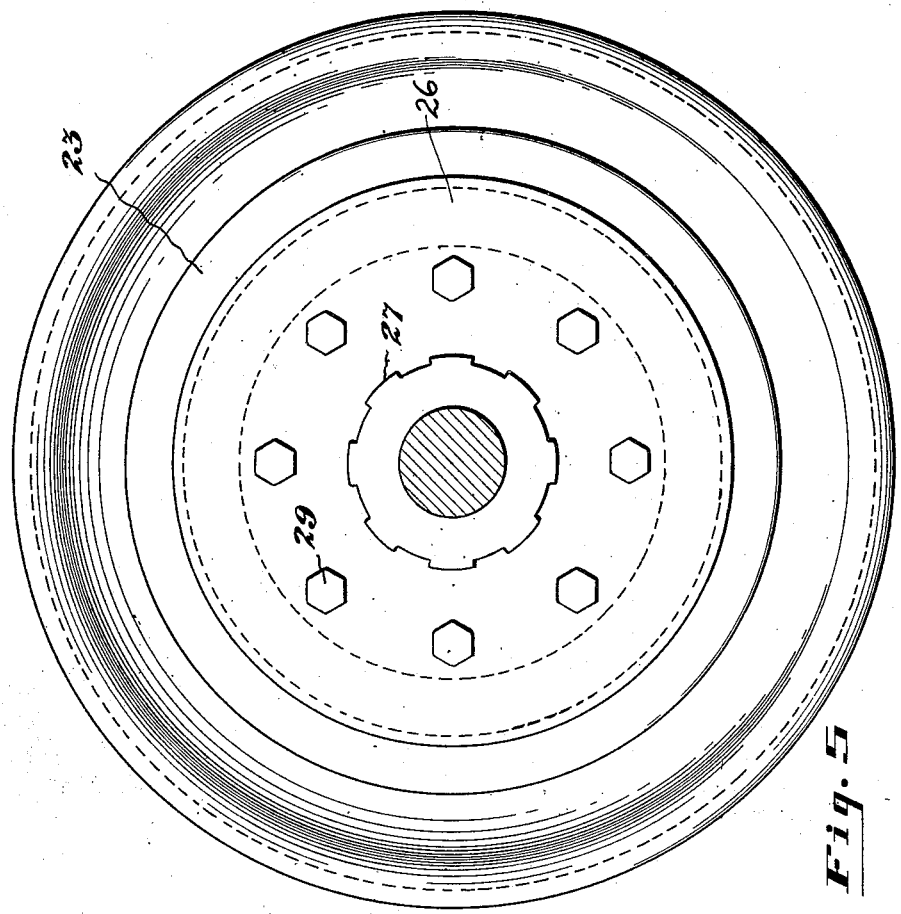
Fig. 5 is a side elevation of the car wheel with the dampener mounted thereon.
Figure 6:
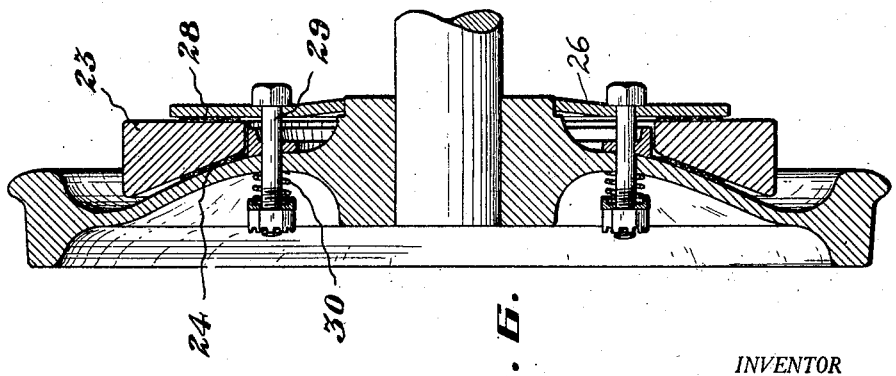
Fig. 6 is a radial section through a car wheel having a modified form of dampener thereon.

Figs. 5 and 6 show a similar form of dampener adapted to be attached directly to a car wheel and in this form, the flywheel 23 is formed in one piece with its outer face of substantially conical form to conform to the inner face of the web of the car wheel. The flywheel bears against an annular piece of friction fabric 24 secured upon the face of the car wheel and is yieldingly pressed toward the car wheel by means of an annular plate 26 which has a central opening provided with notches 27, which receive lugs of similar form formed on the hub of the car wheel. The plate 26 carries on its inner face an annular piece of friction fabric 28 and is yieldingly pressed toward the flywheel to clamp the flywheel between the friction fabric on the car wheel and the friction fabric on the plate by means of bolts 29, carrying springs 30, which serve to maintain a spring pressure on the plate 26 to maintain pressure between the flywheel and the friction fabric on opposite sides thereof.

It will be apparent that in each of the modifications above described, the action of the flywheel is to dampen torsional vibrations and prevent such vibrations from becoming cumulative so that the traction wheels will not have a rail deforming action at any speed at which they may be driven over the rails. It will also be apparent that the dampening device of the present invention is of simple and inexpensive construction and can be applied to a car wheel or car axle without alterations in the mounting of the car axles and without any change in the driving connections to the axle.

What I claim is:

1. In a power driven railway car, the combination with a driving axle and the traction wheels fixed thereto, of means for driving the axle, and means for dampening torsional vibrations in said axle and attached traction wheels.

2. In a power driven railway car, the combination with a driving axle having traction wheels and a spur gear attached to the axle between one of the wheels and the longitudinal center of the axle, of a drive shaft having a pinion meshing with said gear, and means for dampening torsional vibrations in said axle and attached traction wheels.

3. In a power driven railway car, the combination with a driving axle having traction wheels and a spur gear attached to the axle between one of the wheels and the longitudinal center of the axle, of a drive shaft having a pinion meshing with said gear, and means mounted on a traction wheel for dampening torsional vibrations in said axle and attached traction wheels.

4. In a power driven railway car, a rotatable traction unit comprising a driving axle and traction wheels attached thereto, and a dampener comprising a flywheel mounted on said unit and rotatable relatively thereto, and frictional means opposing relative rotation between said flywheel and unit.

5. In a power driven railway car, a rotatable traction unit comprising an axle and traction wheels fixed to the axle, and means for dampening torsional vibrations in said unit comprising a flywheel and means forming a frictional driving connection between said flywheel and unit.

6. In a power driven railway car, the combination with a traction wheel, of a vibration dampener comprising a flywheel and means forming a frictional driving connection between the traction wheel and flywheel.

7. In a power driven railway car, a rotatable traction unit comprising an axle and traction wheels fixed to the axle, a flywheel rotatable with respect to said axle, a member fixed with respect to said axle and in frictional engagement with said flywheel and means for varying the pressure between said member and flywheel.

8. In a power driven railway car, a driving axle, a traction wheel having a rail engaging tread, a hub fixed to the axle and a web connecting the tread and hub, a disc fixed to the hub and spaced inwardly from the web, a two part flywheel mounted between said web and disc, springs interposed between the parts of said flywheel for pressing the same against said web and disc, and means for adjusting said disc toward and away from said web to vary the pressure between the parts of the flywheel and the web and disc.

9. In a power driven railway car, a driving axle, a traction wheel having a rail engaging tread, a hub fixed to the axle and a web connecting the tread and hub, a disc fixed to the hub and spaced inwardly from the web, a two part flywheel mounted between said web and disc, springs interposed between the parts of said flywheel for pressing the same against said web and disc, friction material interposed between the flywheel and the web and between the flywheel and disc, and means for adjusting said disc toward and away from said web.

In testimony whereof I affix my signature.

ELI O. ACKERMAN.